J. J. S. HASSLER.
Hand-Seeder.
No. 18,846.
Patented Dec. 15, 1857.
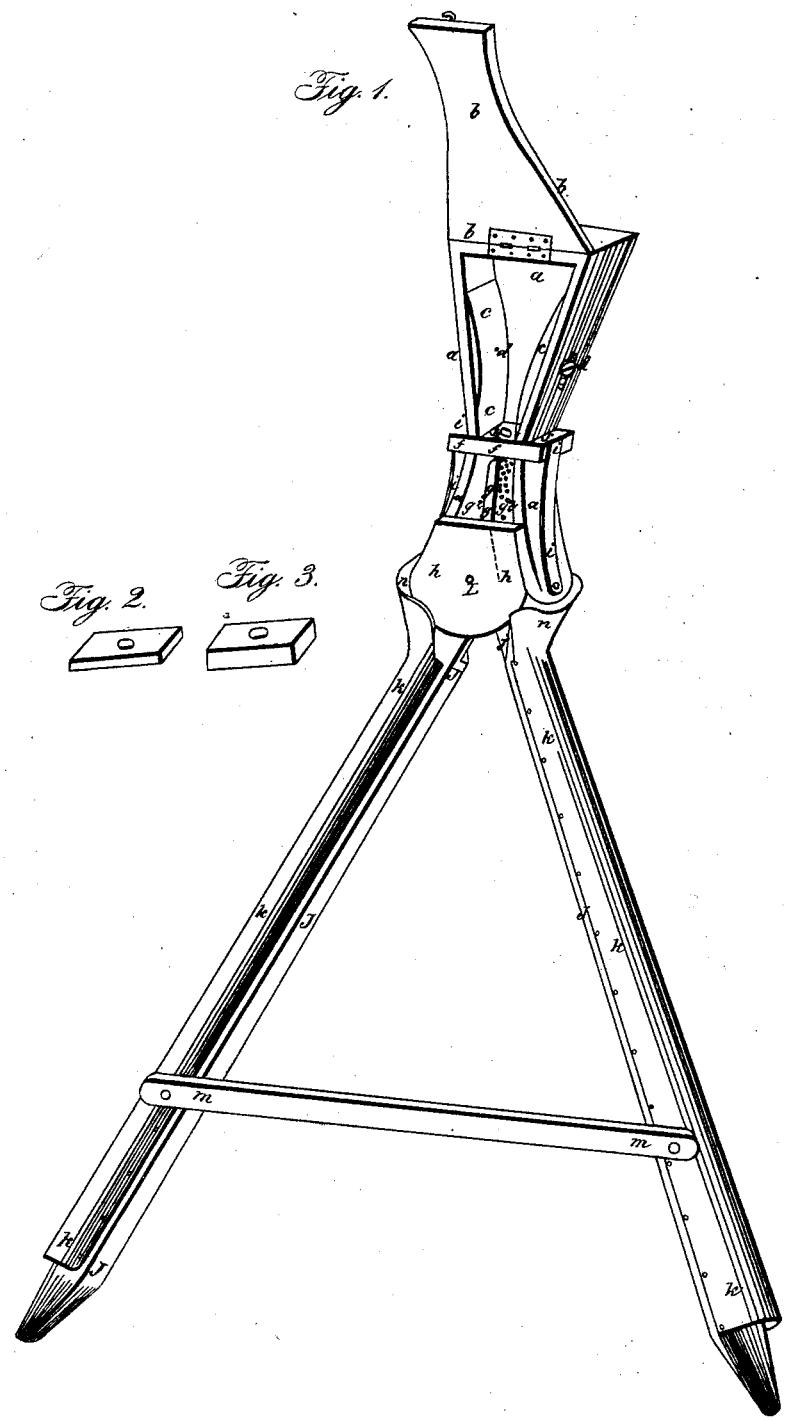

UNITED STATES PATENT OFFICE.

J. J. S. HASSLER, OF RIPLEY, VIRGINIA.

IMPROVEMENT IN CORN-PLANTERS.

Specification forming part of Letters Patent No. 18,846, dated December 15, 1857.

*To all whom it may concern:*

Be it known that I, J. J. S. HASSLER, of Ripley, in the county of Jackson and State of Virginia, have invented and made certain new and useful improvements in hand corn-planters, which improvements I term the "Perambulating Equidistant Planter;" and I do hereby declare that the following is a full, clear, and exact description of the same, reference being had to the accompanying drawings, making a part of this specification.

Figure 1 is a perspective view of the planter complete, Figs. 2 and 3 being views of the different seed detachable sliding perforated gage-valve blocks or seed-escapes.

The nature of my improvements consists in constructing what I have above termed a "perambulating equidistant planter." The better, however, to describe the same, the construction is as follows:

The hopper or seeding-chamber $a\ a\ a\ a\ a\ a$ may be formed of wood or metal, and in shape similar to an hour-glass, or similar to two funnels with their smaller or narrow ends united, thus making a hopper or seed-chamber compressed at about the center of its length, so as to admit of being grasped around conveniently. The hopper may be open at the top, with a hinged lid, or permanently closed, but the side must be provided with a hinged door or flap part, $b\ b\ b$. This flap part is designed to afford access to the chamber of the hopper, so as to prevent any tendency to choking of the hopper, and also to enable the changing of the different detachable sliding perforated gage-valve blocks or seed-escapes. The inner sides of the upper part of the hopper have adjustable graduating tapering throat-blocks $c\ c\ c$, attached by set-screws $d\ d$, inserted in vertical slots $e\ e$, formed in the sides of the hopper. The compressed or grasping part, or the throat part, of the hopper, has a portion of it sawed out transversely to its length sufficient for the insertion therein of the detachable sliding perforated gage-valve blocks or seed-escapes $f\ f\ f$, which are sufficiently long so as to project an inch or so on each side of the hopper and have a circular orifice or seed-escape through the center vertically, as at $f^2$. The lower part of the hopper has a vertical strip or division, $g\ g$, extending downward, of required length, and forming on each side grain or seed flows or channels $g^2\ g^2$. This lower part of the hopper is partially closed by a side covering, as at $h\ h$. To the sides of the lower part of the hopper are attached flexible strips or suitable alternately acting and reacting springs, $i\ i\ i\ i$, the upper extremities of which press against the ends of the detachable sliding perforated gage-valve blocks or seed-escapes $f\ f\ f$. The adjustable graduating tapering throat-blocks $c\ c\ c$ are of a wedge-like shape, or tapering toward their lower terminus, and are adjustable up and down, so as to increase or diminish the throat or escape and also to accommodate the different size detachable sliding perforated gage-valve blocks or seed-escapes $f\ f\ f$. To the lower part of the hopper or seeding-fount is attached two striding legs, $j\ j\ j\ j$, of suitable length formed with sloping spouts $k\ k\ k\ k$. These legs are attached to the hopper by a joint pin-bolt, $l$, so as to admit of distending or closing the legs to any required distance apart. These legs are provided with a cross-tie or stay-rod, $m\ m$, intended to admit of setting and maintaining the legs at any required distance, and to brace and stiffen the legs. The spouts at their upper extremities, at the point of contact with the lower part of the hopper, have flaring or funnel-shaped mouths, as at $n\ n$, standing off somewhat from the bottom of the hopper. The spout part may be of tin, wood, or leather, and attached in any secure manner, extending down to within four or five inches of the legs.

The operation of my improvements is as follows, viz: Grain or seed is deposited in the hopper and the flap $b\ b\ b$ closed down and hooked. The operator grasps the planter around the throat or narrow part, and, advancing, sets one leg at the required hill or place in the furrow or row, and in the act thereof presses the spring next the hand against the end of the detachable sliding perforated gage-valve block or seed-escape $f\ f\ f$, which slides forward, permitting the grain to drop through the orifice, passing down through the channels of the front spout and escaping below at the end next the ground. After passing down the front or advance spout the rear spout is swung or wheeled around forward and the other end of the detachable sliding perforated gage-valve block or seed-escape $f$ comes next the hand, and in like manner as at first each leg and spout alternately being turned, and, as it were, made to step off the hills, and deposits at equal distances with great expedition and accuracy and with but little effort. It is important, however, in swinging around each leg or spout to give the hopper a sudden jerk or shake, so as to prevent any tendency to clog the throat and orifices.

It will be perceived that the springs $i\ i\ i\ i$ alternately become actuating and reacting—that is, one spring in a certain position presses the detachable sliding perforated gage-valve block $f$ forward, causing the escape of the grain, while the other spring reacts and shuts off the supply, all which is done simply by the pressure of the root of the thumb and the ball part of the hand.

By having detachable sliding perforated gage-valve blocks or seeding-escapes $f\ f\ f$ of different thicknesses, with larger or smaller seed-escapes, any size can be inserted between the alternately actuating and reacting pressure-springs $i\ i\ i$ very readily by lifting up the flap $b\ b\ b$ of the hopper, and thus one size may be substituted for another; and, again, if desired, a planter may be held in each hand and operated in parallel rows or furrows simultaneously, and this can be readily done without very much additional effort or physical labor, from the fact that both the legs of the planter are never off the ground at any one time while planting, and consequently the legs or spouts answer as rests or supports to the operator.

In the employment of hand corn-planters heretofore used it has been found difficult to deposit with any accuracy or certainty the various sizes of grain and seed. Besides, too, what is termed the "gourd seed-corn" has been found to be very difficult to drop in suitable quantity; and, again, all hand corn-planters in use tend more or less to clog in the hopper and choke below where the grain escapes; but, owing to the very simple construction of the valves and spout of my planter, all such difficulties are completely overcome.

The advantages, then, in favor of my planter are obvious, and embrace simplicity and cheapness of construction, durability, and portability, and great accuracy in depositing the grain.

Having described the nature and construction of my improvements, and being well aware that various kinds of hand corn-planters have been constructed with internally-arranged springs and valves and seed-escapes, consequently I disclaim such devices; but What I do claim as new, and desire to secure by Letters Patent of the United States, is as follows:

The detachable sliding perforated gage-valve blocks or seed-escapes $f\ f\ f$, with the alternately actuating and reacting pressure-springs $i\ i\ i$, the adjustable graduating tapering throat-blocks $c\ c\ c\ c$, together and in combination with the hopper and striding equidistant legs and spouts, arranged and operated substantially as described and set forth.

J. J. S. HASSLER. [L. S.]

Witnesses:
B. F. GALLAHER,
F. W. B. HASSLER,
JOHN S. GALLAHER, Jr.